United States Patent [19]

Spaargaren

[11] Patent Number: 4,553,434
[45] Date of Patent: Nov. 19, 1985

[54] CAPACITIVE LEVEL GAUGE

[75] Inventor: Klaas Spaargaren, Amsterdam, Netherlands

[73] Assignee: Shell Oil Company, Houston, Tex.

[21] Appl. No.: 524,514

[22] Filed: Aug. 19, 1983

[30] Foreign Application Priority Data

Sep. 9, 1982 [GB] United Kingdom ............... 8225676

[51] Int. Cl.[4] ............................................. G01F 23/26
[52] U.S. Cl. .................................. 73/304 C; 361/284; 340/620
[58] Field of Search ..................... 73/304 C; 361/284; 340/620

[56] References Cited

U.S. PATENT DOCUMENTS

| | | | |
|---|---|---|---|
| 2,963,908 | 12/1960 | Shawhan | 73/304 C |
| 3,343,415 | 9/1967 | Johnston | 73/304 C |
| 3,349,301 | 10/1967 | Bell | 73/304 C |
| 3,911,744 | 10/1975 | Edwards | 73/304 R |
| 3,935,739 | 2/1976 | Ells | 73/304 C |
| 4,003,259 | 1/1977 | Hope | 73/304 C |
| 4,178,623 | 12/1979 | Emmerich et al. | 73/304 C |
| 4,389,900 | 6/1983 | Gutierrez | 73/304 C |
| 4,418,571 | 12/1983 | Asmundsson et al. | 73/304 C |

FOREIGN PATENT DOCUMENTS 2951849  7/1981  Fed. Rep. of Germany .... 73/304 C

*Primary Examiner*—Charles Frankfort
*Assistant Examiner*—Thomas B. Will

[57] ABSTRACT

An improved sectionalized capacitive level gauge is provided. A screen member having appropriate openings therein is positioned between a set of sectionalized first members and a second member of a capacitive level gauge.

12 Claims, 9 Drawing Figures

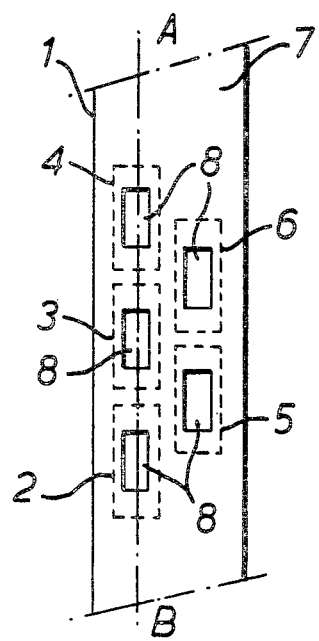
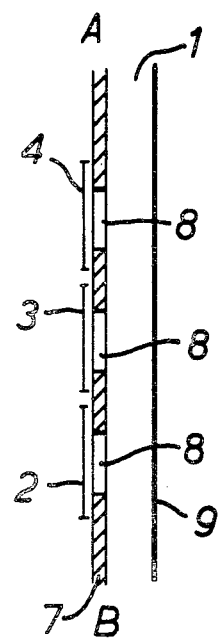
FIG.1a    FIG.1b
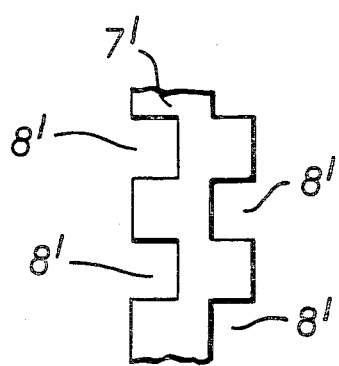
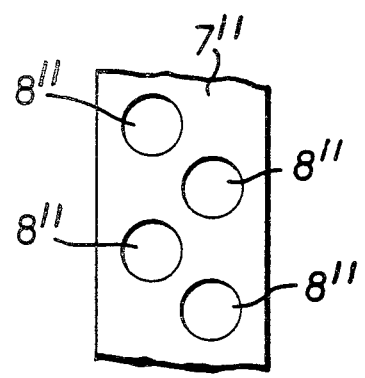
FIG.2a    FIG.2b

CAPACITIVE LEVEL GAUGE

BACKGROUND OF THE INVENTION

The invention relates to a device for measuring capacitively the level of a fluid in a tank or container.

In particular the invention relates to a capacitive level gauge which is adapted to be used, for example, in storage tanks (for example on ships or on land), in depots, road tankers, retail stations, etc.

Level gauges based upon the capacitance measurement principle are generally known and operate as follows:

The level gauge consists of two means, for example, isolated metal tubes, placed vertically in the fluid in the tank or container, the two means forming a capacitance. The fluid fills the space between the two means and serves as a dielectric. The dielectric between the two means influences the capacitance value of the gauge. The influence of a determined dielectric on a capacitance value is known to those skilled in the art and will not be explained in detail. Since the dielectric above the level in the tank or container may be a gas and the dielectric below the level may be a liquid, it will be clear to those skilled in the art that from a capacitance-measurement the level of this liquid in the tank can be determined.

It is already known to use a sectionalized level gauge comprising a plurality of sections or segments, means for measuring the values of the segment-capacitance and means for deriving information concerning the level in the tank from the measured capacitance-values. However, such sectionalized level gauges require tight tolerances of the segments or sections when accurate measurements are required. However, obtaining the tight tolerances during construction and assembly is costly and time-consuming.

It is therefore an object of the present invention to provide a simplified and cheap sectionalized level gauge, in particular for use in retail stations, the transmission of the sections not being dependent on the section-tolerances.

It is another object of the invention to provide a sectionalized level gauge which can operate over a large range of temperatures and is suitable for operation in many liquids including crude oil and chemicals.

SUMMARY OF THE INVENTION

The invention provides a device for measuring capacitively the level of a fluid in a tank or container, comprising two means which are placed in the fluid at a determined distance from one another, and being adapted for capacitive measurements, the first means consisting of a plurality of individual sections, each section having a determined size and second means for measuring the values of the section-capacitances and means for deriving information concerning the level in the tank from the measured capacitance-values, wherein a screen is placed between the first means and the second means.

Other objectives, advantages and applications of the present invention will be made apparent by the following detailed description of the preferred embodiments of the present invention.

BRIEF DESCRIPTION OF THE DRAWINGS

FIG. 1a represents schematically a front view of a part of a capacitive sectionalized level gauge provided with a screen according to the invention.

FIG. 1b represents schematically a cross-section along the line A–B of the capacitive level gauge of FIG. 1a.

FIGS. 1c, 1d, 1e, 1f and 1g schematically represent alternate embodiments of the invention.

FIGS. 2a and 2b represent front views of advantageous embodiments of the screen according to the invention.

In FIGS. 1a and 1b the same reference numbers have been used.

DETAILED DESCRIPTION OF THE PREFERRED EMBODIMENTS

With reference now to FIGS. 1a and 1b of the drawings a capacitive level gauge 1 consisting of a number of segments or sections 2, 3, 4, 5, 6 and a pick-up plate 9 has been represented schematically. (For the sake of clarity only five sections have been represented). The sections are situated below each other in a vertical direction and may be located in such a way that they are offset with respect to one another. (For the sake of clarity no construction connections between the segments have been represented.) Each section forms a capacitor to the pick-up plate 9. As already indicated in the above, the capacitor values are influenced by the fluid that can enter the space between the sections and the pick-up plate. The pick-up plate 9 is placed at a determined distance, for example, 5 mm, from the sections 2, 3, 4, 5, 6.

Starting from the bottom and going to the top all the capacitance values are measured in sequence by a suitable device such as, for example, common gauge-head electronics (not shown) digitized and transmitted serially to a receiver-computer (not shown) in order to obtain level information. However, it will be appreciated that the step of measuring the capacitance values of the section can be carried out in any way suitable for the purpose and is not necessarily restricted to starting from the bottom and going to the top. Further, the electronics and further processing devices may be situated in any way suitable for the purpose. For example, electronic circuits (not shown) may be located near the sections and the pick-up plate; but, as already indicated, it will also be possible to use electronics placed on top of the level gauge or even outside the tank or container. In the latter case operation of the gauge is possible at much higher temperatures in the tank.

For the sake of clarity the electronics and further processing devices have not been represented. As already indicated earlier the capacitance of a section situated below the fluid level has a determined value and this value differs from the capacitance value of a section above the fluid level. By determining the capacitance values of all sections, for example, serially, a change in these values can be determined, and since the place of the relevant section and the height of each section are known, it will be clear that level information can be obtained. Such a determination is known to those skilled in the art and can, for example, be carried out by a computer.

The level gauge according to the invention comprises a screen 7 between the sections and the pick-up plate. The screen may be made of metal and is provided with openings for example openings 8. It appears that the transmission of a segment or section is now only determined by the size of the openings in the screen and is not influenced by the segment-tolerances. Only the sizes and locations of the openings in the screen will now require tight tolerances, for example, of up to 0.2 mm; this requirement can be met in the production of a screen length, for example, of up to 4 meters. This will lead to considerable cost reduction in the production of the gauge.

It will be appreciated that any material suitable for the purpose can be used for screen construction material. An advantageous material is, for example, Invar. It will further be appreciated that any shape of the openings suitable for the purpose is possible. In advantageous embodiments of the invention the openings in the screen are 8–80 mm in height. A segment-height of 80 mm may, for example, be used when the electronics is not placed within the level gauge itself.

In FIGS. 1a and 1b the capacitive sections are planes. However, in an advantageous embodiment the size of the sections can be reduced to one or more wires 2' through 6' in FIGS. 1c and 1d, and 10, 11 in FIGS. 1e and 1f. The wire can be an insulated wire having an insulation 12 of, for example, Teflon as shown in FIG. 1g. In such a case one or more wires 9 can be used for the pick-up plate as well as shown in FIG. 1g.

FIG. 2a represents a front-view of an advantageous embodiment of the screen provided with sleeves. A screen 7' provided with indentations 8' has been represented. FIG. 2b represents a front-view of another advantageous embodiment of the screen. A screen 7" is provided with circular openings 8" and in this case the response of a section is a non-linear function of fluid height. However, a microcomputer can compensate for this effect during the interpolation.

Various modifications of the invention will become apparent to those skilled in the art from the foregoing description and accompanying drawings. Such modifications are intended to fall within the scope of the appended claims.

What is claimed is:

1. An apparatus for use in measuring the level of a fluid in a container, said apparatus comprising: first means adapted for capacitive measurements and having a plurality of individual sections with each of said sections having a predetermined size; second means adapted for capacitive measurements, said first and second means being adapted to be positioned in a fluid at a predetermined distance from one another; and a screen positioned between said first and second means having openings therein proximate said sections of said first means to define areas of transmission between said sections and said second means.

2. An apparatus as recited in claim 1, wherein said openings are staggered with respect to one another.

3. An apparatus as recited in claim 1, wherein said screen is made of metal.

4. An apparatus as recited in claim 1, wherein the height of said openings is in the range of 8–80 millimeters.

5. An apparatus as recited in claim 1, wherein said openings are circular.

6. An apparatus as recited in claim 1, wherein said openings are rectangular.

7. An apparatus as recited in claim 1, wherein each of said plurality of individual sections comprises at least one wire.

8. An apparatus as recited in claim 7, wherein said wire is insulated.

9. An apparatus as recited in claim 8, wherein said insulation is Teflon.

10. An apparatus as recited in claim 1, wherein said second means is a pick-up plate.

11. An apparatus as recited in claim 10, wherein said pick-up plate consists of at least one wire.

12. An apparatus as recited in claim 1, wherein said screen is made of Invar.

* * * * *